(12) United States Patent
Bettiga et al.

(10) Patent No.: US 10,095,280 B2
(45) Date of Patent: Oct. 9, 2018

(54) VARIABLE WIDTH PCIE INTERFACE

(71) Applicant: Ciena Corporation, Hanover, MD (US)

(72) Inventors: Raleigh Bettiga, Penngrove, CA (US); Colin Wilson, Sebastopol, CA (US); Wayde Jaskela, Windsor, CA (US)

(73) Assignee: Ciena Corporation, Hanover, MD (US)

( * ) Notice: Subject to any disclaimer, the term of this patent is extended or adjusted under 35 U.S.C. 154(b) by 113 days.

(21) Appl. No.: 14/860,145

(22) Filed: Sep. 21, 2015

(65) Prior Publication Data
US 2017/0083057 A1 Mar. 23, 2017

(51) Int. Cl.
H05K 7/14 (2006.01)
G06F 1/18 (2006.01)

(52) U.S. Cl.
CPC .................... G06F 1/185 (2013.01)

(58) Field of Classification Search
CPC ..... G06F 1/185; H05K 7/1418; H05K 7/1425
See application file for complete search history.

(56) References Cited

U.S. PATENT DOCUMENTS

| | | | |
|---|---|---|---|
| 6,477,603 B1 | 11/2002 | Locker | |
| 6,935,868 B1* | 8/2005 | Campini | G06F 1/186 361/748 |
| 7,246,190 B2 | 7/2007 | Nguyen | |
| 7,340,557 B2 | 3/2008 | Kong | |
| 7,506,092 B2 | 3/2009 | Su | |
| 7,600,112 B2 | 10/2009 | Khatri | |
| 7,782,325 B2 | 8/2010 | Gonzalez | |
| 8,645,603 B2 | 2/2014 | Melvin, Jr. | |
| 2004/0037054 A1* | 2/2004 | Ice | H05K 7/1418 361/752 |
| 2005/0215085 A1 | 9/2005 | Mehta | |
| 2005/0270298 A1 | 12/2005 | Thieret | |
| 2006/0274515 A1* | 12/2006 | Arthur | H05K 7/1424 361/796 |
| 2006/0294279 A1 | 12/2006 | McKee | |
| 2007/0042617 A1* | 2/2007 | Jin | G06K 7/0034 439/76.1 |
| 2007/0119792 A1* | 5/2007 | Hendrix | H05K 7/1418 211/26 |
| 2008/0148303 A1* | 6/2008 | Okamoto | G11B 33/126 720/652 |
| 2008/0293265 A1* | 11/2008 | Nguyen | H05K 1/02 439/74 |

(Continued)

FOREIGN PATENT DOCUMENTS

CN 101382925 B 7/2011

Primary Examiner — Hoa C Nguyen
Assistant Examiner — Christopher L Augustin
(74) Attorney, Agent, or Firm — Clements Bernard Walker PLLC; Christopher L. Bernard; Lawrence A. Baratta, Jr.

(57) ABSTRACT

A chassis includes a midplane defining a plurality of expansion sockets on one side and one or more motherboard sockets on the other. A modular motherboard is removably inserted in the chassis and engages the one or more motherboard sockets. An expansion card may engage with one or more of the motherboard sockets simultaneously. The expansion sockets are arranged in a coplanar and collinear manner to enable a planar expansion card to simultaneously insert within multiple expansion sockets. The motherboard allocates lanes to the expansion card in response to detecting a number of sockets occupied by the expansion card.

20 Claims, 13 Drawing Sheets

(56) References Cited

U.S. PATENT DOCUMENTS

| | | | |
|---|---|---|---|
| 2010/0254100 A1* | 10/2010 | Kim | H05K 7/1461 361/752 |
| 2013/0024591 A1 | 1/2013 | Sun | |
| 2014/0129753 A1* | 5/2014 | Schuette | G06F 13/4068 710/301 |
| 2014/0347808 A1* | 11/2014 | Hong | G06F 1/186 361/679.32 |
| 2015/0309952 A1* | 10/2015 | Breakstone | G06F 13/4022 710/313 |
| 2015/0373115 A1* | 12/2015 | Breakstone | G06F 11/2012 709/217 |
| 2016/0044820 A1* | 2/2016 | Xu | H05K 7/20727 361/679.31 |

* cited by examiner

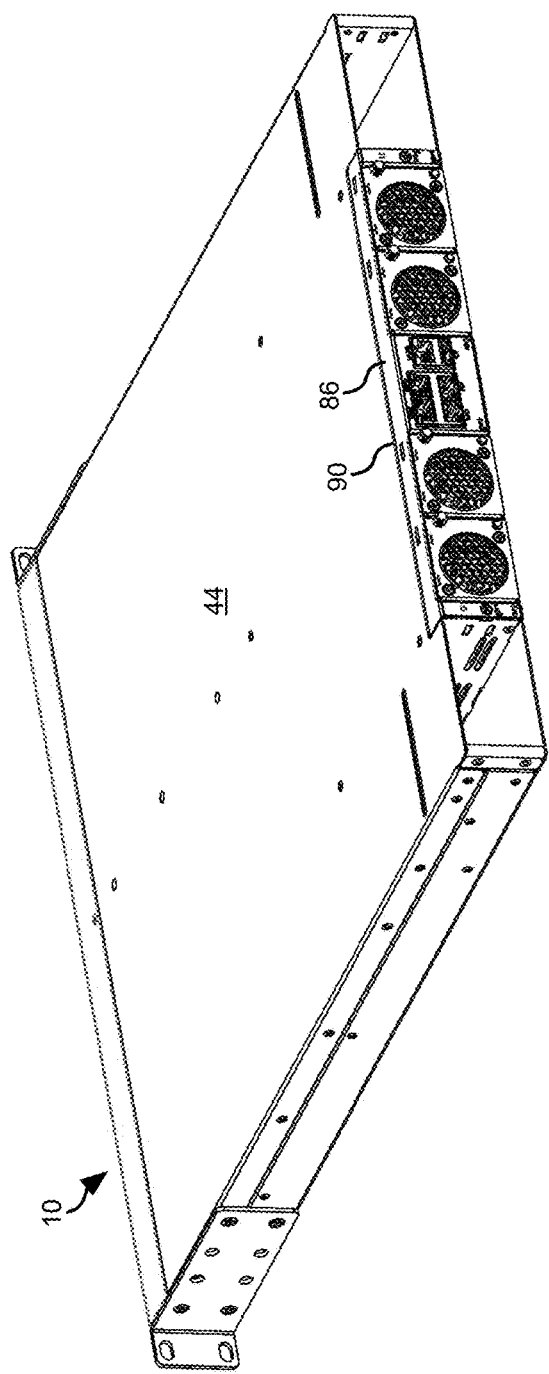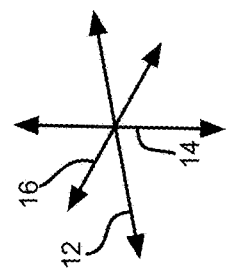
Fig. 6

US 10,095,280 B2

VARIABLE WIDTH PCIE INTERFACE

BACKGROUND

Field of the Invention

This invention relates to systems and methods for interfacing a motherboard with one or more expansion cards, such as PCIe expansion cards.

Background of the Invention

Since the early days of computers, the basic system architecture has included a motherboard and one or more expansion slots. The motherboard includes the computer's most basic circuitry and components. For example, a motherboard typically included a central processing unit, memory (e.g. RAM), a basic input/output system (BIOS), the expansion slots, and interconnecting circuitry.

Expansion cards were originally used for many functions, such as audio processing, video processing, networking, and the like. Although many of these functions have been incorporated into the motherboard, expansion slots are still used for critical functions. In particular, routers, switches, and other high-performance networking components are often incorporated into expansion slots in rack-mounted servers.

The systems and methods described herein provide an improved approach for implementing expansion slots in a rack-mounted server or other applications.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 6 is an isometric view illustrating the motherboard inserted into the chassis in accordance with an embodiment of the present invention;

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
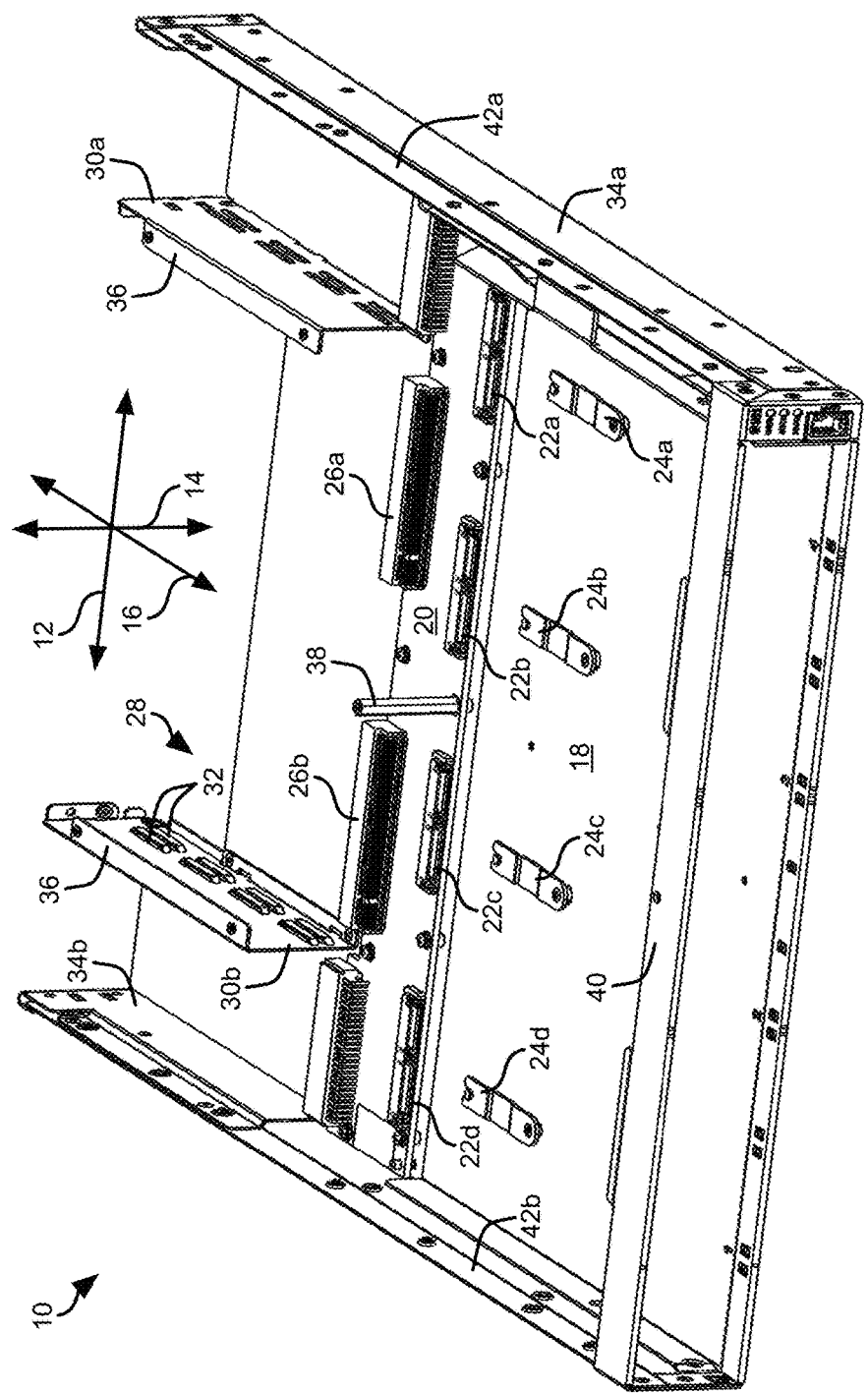
FIG. 1 is an isometric view of a chassis implementing a mid plane and mother board slot in accordance with an embodiment of the present invention.

Referring to FIG. 1, a chassis 10 may be sized to insert within a slot in a rack-mounted server and may define a securement interface known in the art for facilitating mounting. The chassis 10 may be understood with respect to a vertical direction 12, horizontal direction 14, and a longitudinal direction 16 that are mutually perpendicular. The vertical direction 12 corresponds to the direction of gravity. The horizontal direction 14 is perpendicular to the vertical direction and is parallel to a support surface on which the chassis 10 rests. A row of chassis 10 may be arranged along the horizontal direction 14 in rack. The longitudinal direction 16 is perpendicular to the vertical and horizontal directions 12, 14. Although various features are described herein with references to the vertical, horizontal, and longitudinal directions 12, 14, 16, these merely indicate relative position and orientation of components to one another. The chassis 10 may be placed in any orientation during use such that the vertical, horizontal, and longitudinal directions 12, 14, 16 may not correspond to absolute vertical, horizontal, or longitudinal directions, respectively, in some applications. For purposes of this disclosure a front of the chassis 10 is defined as the side into which expansion cards are inserted.

The chassis 10 includes a left plate 18 that is generally square or rectangular. A midplane 20 extends across the left plate 18 along the vertical direction 12 and may fasten directly to the left plate 18. The mid plane may span substantially the entire left plate 18 in the vertical direction 12, i.e. 80, 90, or 100 percent of the extent of the left plate 18 in the vertical direction 12.

A plurality of expansion sockets 22a-22d are mounted to the midplane 20. In the illustrated embodiment, the expansion sockets 22a-22d are PCIe sockets, however other socket types may be used. Likewise, although there are four expansion sockets 22a-22d in the illustrated implementation, more or fewer may be included. For example, 3, 6, 8, or some other number of expansion sockets 22a-22d may be implemented.

Front faces of the expansion sockets 22a-22d may abut a front edge of the midplane 20 or otherwise be positioned to receive an expansion card connector. Likewise, the front faces of the sockets 22a-22d may point towards the front of the chassis 10 along the longitudinal direction 16 and permit insertion of the connectors of expansion cards along an insertion direction that is also parallel to the longitudinal direction 16. The expansion sockets 22a-22d may be distributed along the vertical direction 12 with uniform spacing between adjacent sockets 22a-22d.

In some embodiments, the left plate 18 may define one or more detents 24a-24d that engage expansion cards inserted into the sockets 22a-22d and resist removal thereof. The detents 24a-24d may be embodied as leaf springs or any other detent mechanism known in the art.

The midplane 20 may include one or more motherboard sockets 26 that receive a connector of a motherboard. The midplane 20 may define wires and/or other components coupling pins of the expansion sockets 22a-22d to the pins of the motherboard sockets 26. For example, the pins of the expansion sockets 22a, 22b may be coupled to motherboard socket 26a and the pins of expansion sockets 22c, 22d may be coupled to motherboard socket 26b. However, in other embodiments, all of the pins of all of the expansion sockets 22a-22d are coupled to the pins of a single motherboard socket.

The faces of the motherboard sockets 26a, 26b may face an opposite direction from the faces of the expansion sockets 22a-22d, i.e. toward the back of the chassis 10 along the longitudinal direction 16. Likewise, the motherboard sockets 26a, 26b may permit insertion of a connector of a motherboard along an insertion direction that is parallel to the longitudinal direction 16. In some embodiments, the motherboard sockets 26a, 26b may face the same direction as the expansion sockets 22a-22d and be offset in the horizontal direction 14 to enable both to be occupied simultaneously.

The chassis 10 may define a motherboard receiver 28 for supporting a motherboard inserted into the motherboard sockets 26a, 26b. In the illustrated embodiment, the motherboard receiver 28 is defined by flanges 30a, 30b mounted to the left plate 18 along the longitudinal direction 16 and extending inwardly from the left plate 18 in the horizontal direction 14. The flanges 30a, 30b are offset from one another in the vertical direction 12 thereby defining a space to receive a motherboard. The flanges 30a, 30b may include pairs of tabs 32 distributed therealong in the longitudinal direction 16. The tabs 32 of a pair of tabs are spaced apart in the horizontal direction 14 in order to receive an edge of a circuit board. The tabs 32 of the flange 30a may project toward the flange 30b and the tabs 32 of the flange 30b may project toward the flange 30a. The tabs 32 may be defined by cutting and bending sheet metal from which the flanges 30a, 30b are formed. The pairs of tabs 32 may be replaced with any groove or channel that permits sliding of a circuit board along the longitudinal direction 14 and restrains movement in the horizontal direction 14.

The chassis may further include a bottom edge 34a and top edge 34b. The edges 34a, 34b may mount to opposite edges of the left plate 18 along the vertical direction 12. The edges 34a, 34b extend along the edges of the bottom plate 18 along the longitudinal direction and project inwardly from the bottom plate 18 along the horizontal direction 12. In some embodiments, edges 34a, 34b are formed monolithically with the left plate 18, such as by bending edges of the left plate 18 along creases extending in the longitudinal direction 16.

The chassis 10 may define covers for securing a right plate thereto. For example, the flanges 30a, 30b may define tabs 36 at a distal edge thereof, such as by bending the flanges 30a, 30b along a crease extending in the longitudinal direction 16. In some embodiments, a post 38 may secure to the mid plane 20, or pass through the mid plane 20 and secure to the left plate 18. The post 38 may define a threaded aperture for receiving a screw securing a right plate to the post 38. In some embodiments, an edge plate 40 extends across the bottom and top edges 34a, 34b in the vertical direction 12 at the front edge of the chassis 10. The edge plate 40 may be offset from the bottom plate 18 thereby defining an opening for receiving expansion cards inserted within the expansion sockets 22a-22d. The edge plate 40 may define an outer surface that is flush with a right plate secured to the edges 34a, 34b.

In some embodiment, the edges 34a, 34b may define inset portions 42a, 42b that are portions of the edges 34a, 34b that are offset inwardly along the vertical direction 12. The inset portions 42a, 42b may extend along some or all of the extent of the edges 34a, 34b in the longitudinal direction 16.

Figure 2:
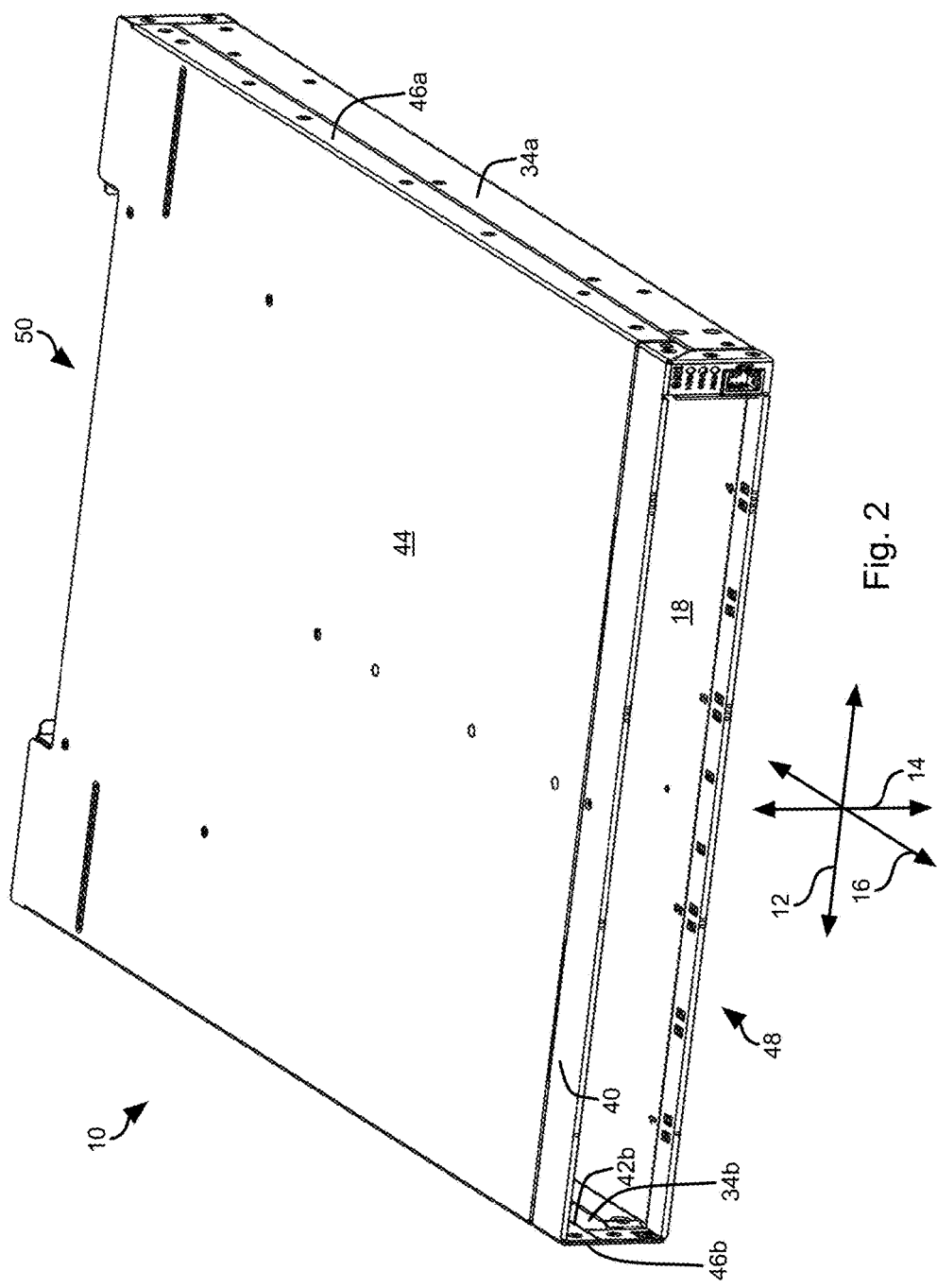
FIG. 2 is an isometric view of the chassis having a top plate attached.

Referring to FIG. 2, a right plate 44 may secure to the edges 34a, 34b as illustrated having edges 46a, 46b of the right plate positioned within the inset portions 42a, 42b of the edges 34a, 34b. As noted above, an upper surface of the right plate may be flush with the edge plate 40. With the right plate secured, an opening 48 may be defined at the front face of the chassis 10 for receiving expansion cards and an opening 50 is defined at the back face of the chassis 10 for receiving a motherboard.

Figure 3:
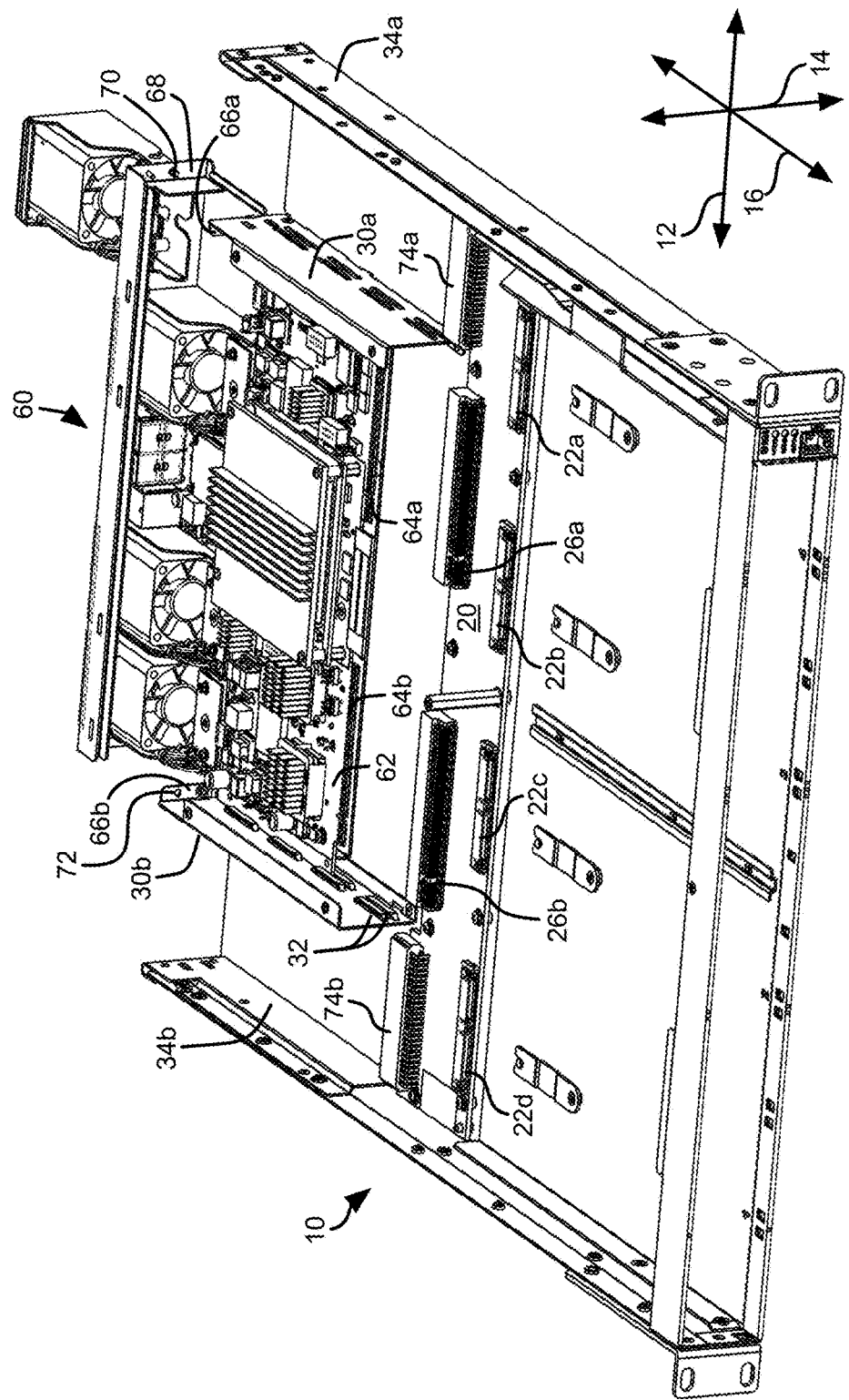
FIG. 3 is an isometric view illustrating insertion of a motherboard into the chassis in accordance with an embodiment of the present invention.

FIG. 3 illustrates the insertion of a motherboard 60 into the motherboard receiver 28. The right plate 44 is not shown to enable visualization of the insertion, however the motherboard may be inserted as shown when the right plate 44 is in place in the manner shown in FIG. 2. Likewise, the motherboard 60 may be inserted as shown when the chassis 10 is mounted within a rack.

As illustrated, a circuit board 62 of the motherboard 60 may insert between tabs 32 of the pairs of tabs and slide into the chassis 10 along the longitudinal direction. The circuit board 62 is oriented parallel to the vertical and longitudinal directions 12, 16 when inserted. The motherboard 60 is inserted until one or more connectors 64a, 64b insert within the motherboard sockets 26a, 26b. As is apparent in FIG. 3, the connectors 64a, 64b may be embodied as rows of contacts formed directly on the circuit board 62. However, other types of connectors 64a, 64b may also be implemented.

In some embodiments the flanges 30a, 30b may further define tabs 66a, 66b near the back edge of the chassis 10. The tabs may extend in the vertical and horizontal directions 12, 14 for securing to a face plate 68 secured to the circuit board 62. The faceplate 68 may be a sheet of material extending in the vertical and horizontal direction 12, 14. The face plate 68 may define apertures 70 positioned corresponding to apertures 72 in the tabs 66a, 66b enabling securement of the face plate 68 to the tabs 66a, 66b.

The motherboard 60 may define its own power supply. In the illustrated embodiment, power supply sockets 74a, 74b may be coupled to the midplane 20. The midplane 20 may define wires and circuits coupling power from the sockets 74a, 74b to the motherboard connectors 26a, 26b and to the expansion sockets 22a-22d. As shown in FIG. 3 a space between the flange 30a and the bottom edge 34a may be sized to receive a power supply coupled to the socket 74a. Likewise, a space between the flange 30b and the top edge 34b may receive a power supply coupled to the socket 74b.

Figure 4:
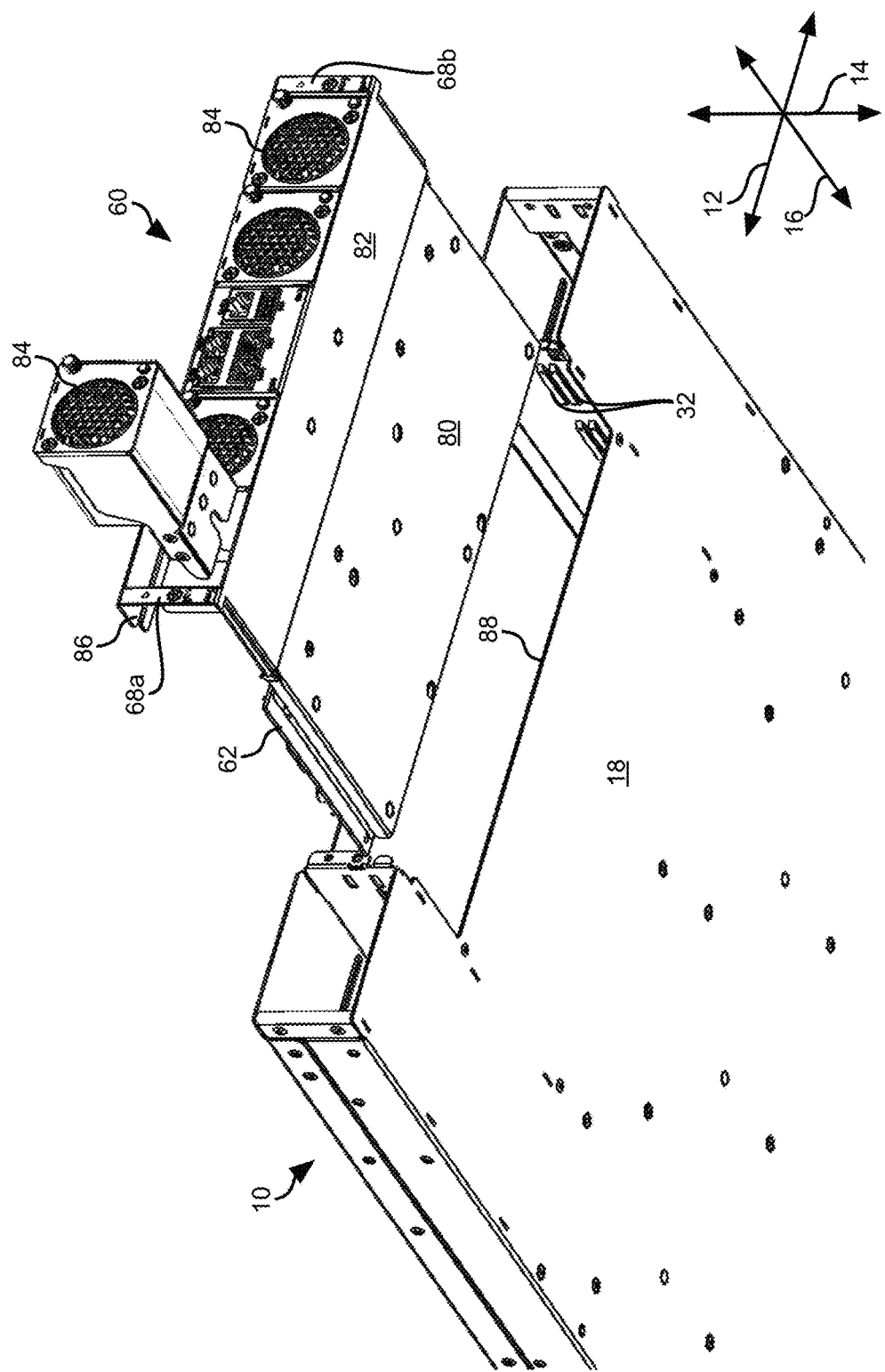
FIG. 4 is a lower isometric view illustrating insertion of the motherboard into the chassis in accordance with an embodiment of the present invention.

Referring to FIG. 4, the circuit board 62 may mount to a base plate 80. The base plate 80 may be made of sheet metal. As is apparent in FIG. 4, the extent of the base plate 80 in the vertical direction 12 may be less than that of the circuit board 62, enabling the circuit board 62 to protrude outwardly for engaging the pairs of tabs 32.

The base plate 80 may include a recessed portion 82 that is offset outwardly from the remainder of the base plate 80 along the horizontal direction 14. The recessed portion 82 may define a place for the securement of various fan modules 84 to the motherboard 60.

In the illustrated embodiment, a cross bar 86 extends above the recessed portion 82. For example, faceplate 68 may be embodied as strips 68a, 68b extending from a back edge of the recessed portion 82 and connect to the cross bar 86 that extends between the strips 68a, 68b. The cross bar 86, strips 68a, 68b, recessed portion 82, and the remainder of the base plate 80 may be formed from a single sheet of metal bent and cut into the illustrated configuration.

Figure 5:
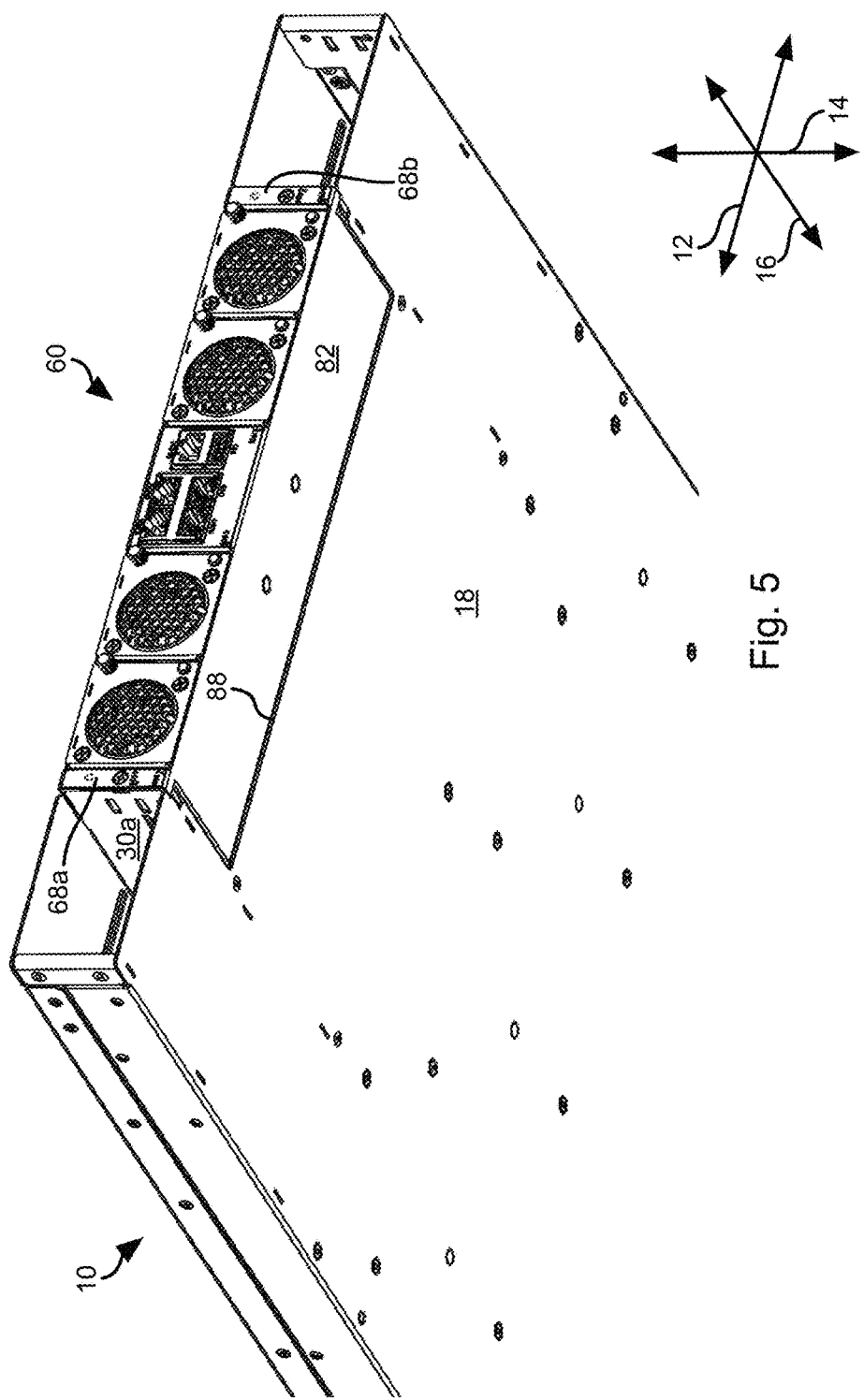
FIG. 5 is a lower isometric view illustrating insertion the motherboard inserted into the chassis in accordance with an embodiment of the present invention.

In the illustrated embodiment, the left plate 18 defines a cutout 88 sized to receive the recessed portion 82. As shown in FIG. 5, when the motherboard 60 is fully inserted within the chassis 10, the recessed portion 82 is positioned within the cutout 88 and the left surface of the recessed portion is flush with the left surface of the left plate 18 in a plane parallel to the vertical and longitudinal directions 12, 16. As shown in FIG. 6, the cross bar 86 may fit within a cutout 90 in the right plate 44 such that a right surface of the cross bar 86 is flush with a right surface of the right plate 44 in a plane parallel to the vertical and longitudinal directions 12, 16.

Figure 7:
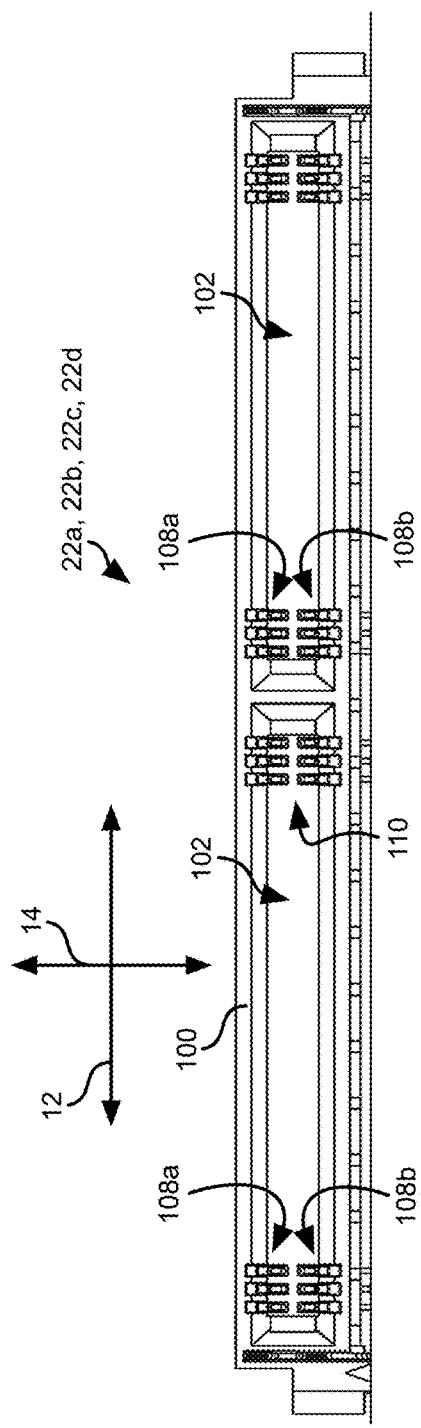
FIG. 7 is a front view of a PCIe socket in accordance with the prior art.

Referring to FIG. 7, the expansion sockets 22a-22d may advantageously be arranged such that a single expansion card may connect to multiple sockets 22a-22d. Each socket 22a-22d may define a front face oriented in the vertical and horizontal planes 12, 14. An opening 102 extends through the face 100, i.e. in the longitudinal direction inwardly from the face 100. The opening 102 may be much longer in the vertical direction 12 than its width in the horizontal direction 14. For example, the opening 102 may have a length in the vertical direction that is between five and 20 times a width of the opening 102 in the horizontal direction 14. In the illustrated embodiment, the length in the vertical direction is about 10 times the width in the horizontal direction 14. In the illustrated embodiment, each socket 22a-22d includes two openings 102. In other embodiments, a single opening 102 is used that is equal to a combined with of the two openings. In such embodiments, the length in the vertical direction may be between 10 and 40 times (e.g. 20 times) the width in the horizontal direction 14.

The sockets 22a-22d include rows 108a, 108b of pins. In some embodiments, only one row 108a, 108b is included. In others, more than two rows of pins may be used, i.e. by placing a planar member protruding into the opening 100 and having one or more rows of pins thereon. In the illustrated embodiment, the rows 108a, 108b of pins are placed on opposite sides of the opening 102 that are opposite one another in the horizontal direction 14. A gap 110 is defined between the rows of pins 108a, 108b that is sized to receive a connector of an expansion card.

Figure 8:
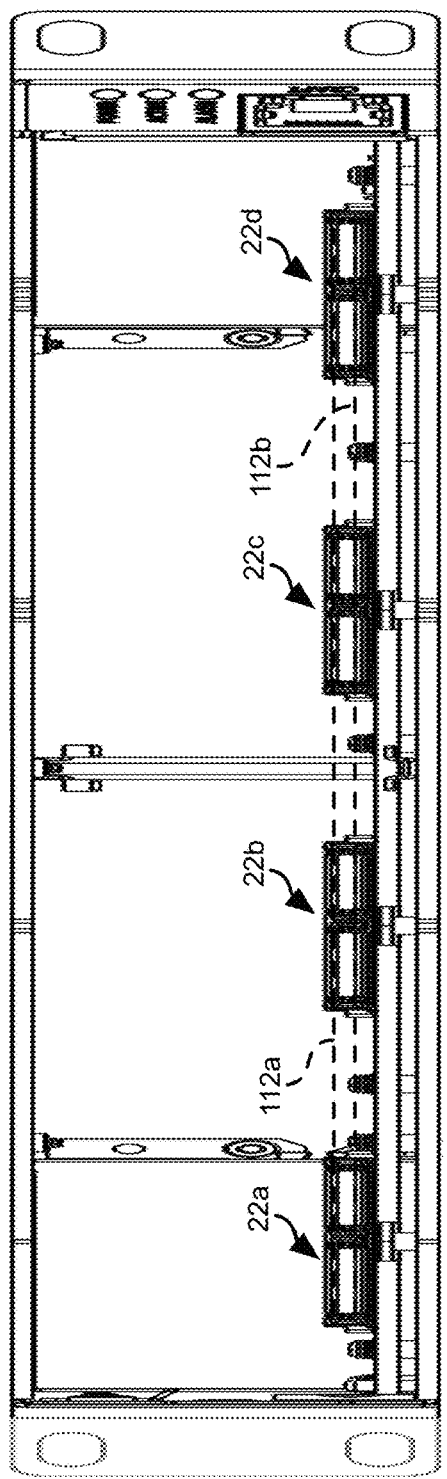
FIG. 8 is a front view of an arrangement of PCIe socket in accordance with an embodiment of the present invention.

FIG. 8 illustrates the arrangement of the expansion sockets 22a-22d. The image of FIG. 8 has been stretched in the horizontal direction relative to its actual proportions to enable visualization of the invention. The rows of pins 108a, 108b may be aligned with one another such that they are collinear. In particular, each row of pins 108a of each expansion socket 22a-22d may be collinear along line 112a with every other row of pins 108a of the other expansion sockets 22a-22d. Likewise, each row of pins 108b of each expansion socket 22a-22d may be collinear along line 112b with every other row of pins 108b of the other expansion sockets 22a-22d. For example, where all pins have identical nominal shape, a point on that shape for each pin in each row 108a will lie on line 112a. A point on that shape for each pin in each row 108b will lie on line 112. Of course, the collinear positioning of the pins of the rows of pins 108a, 108b is subject to manufacturing tolerance. For example, there may be some line 112a (or 112b) such that a same feature of each pin (each a top or bottom of each pin) of each row 108a (or row 108b) is within X mm from the line 112a (or 112b), where X is a tolerance such as 0.1 mm, 0.01 mm, or some other tolerance. The tolerance X may be defined in terms of insertability of an expansion card. Specifically, the tolerance X may be such that a single circuit board that is planar may insert within each expansion socket 22a-22d without deformation, without deformation in excess of what would cause damage, or with a predetermined amount of insertion force below a threshold.

Figure 9:
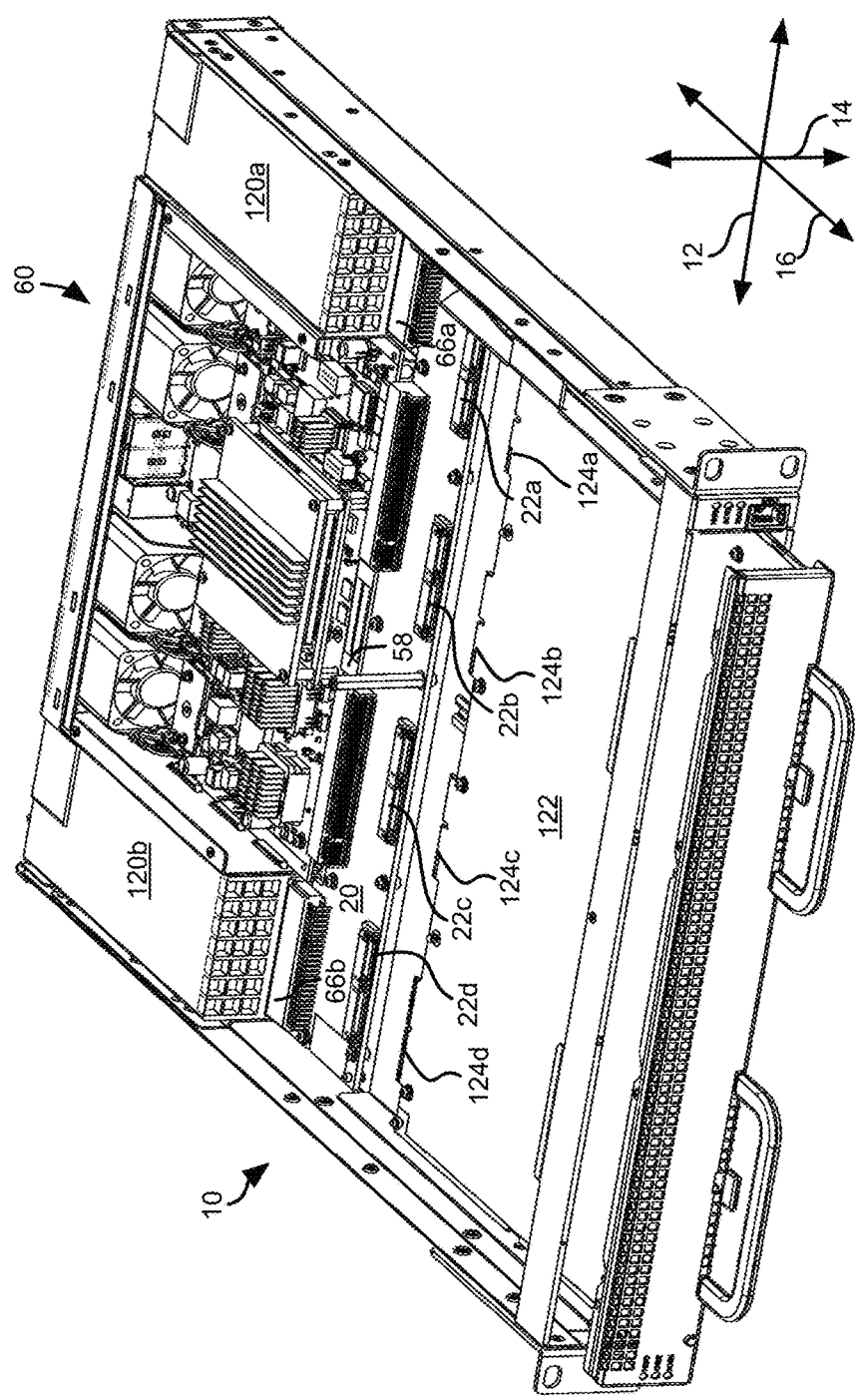
FIG. 9 is an isometric view illustrating the chassis having an expansion card occupying four PCIe sockets in accordance with an embodiment of the present invention.
Figure 10:
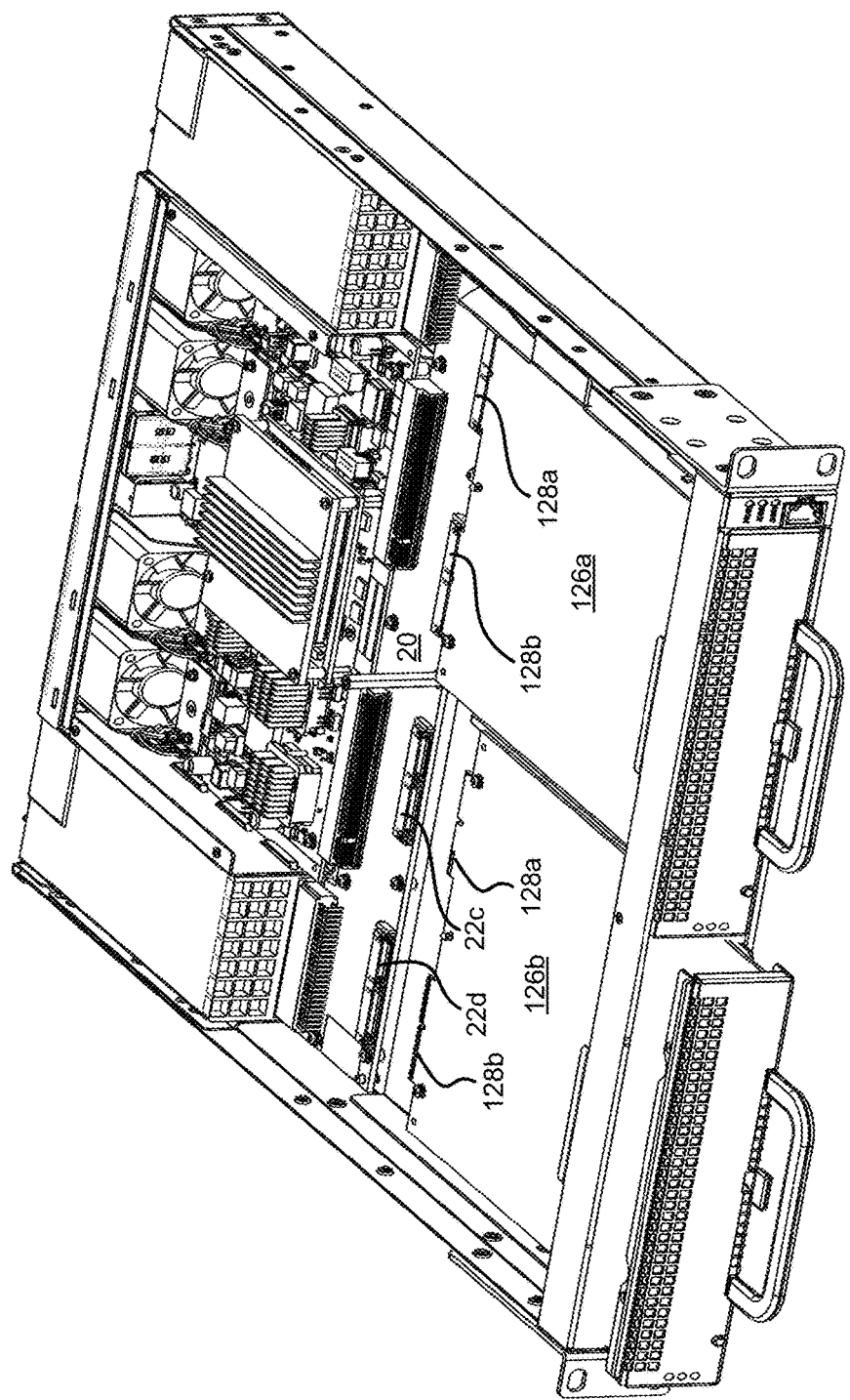
FIG. 10 is an isometric view illustrating the chassis having two expansion cards each occupying two PCIe sockets in accordance with an embodiment of the present invention.
Figure 11:
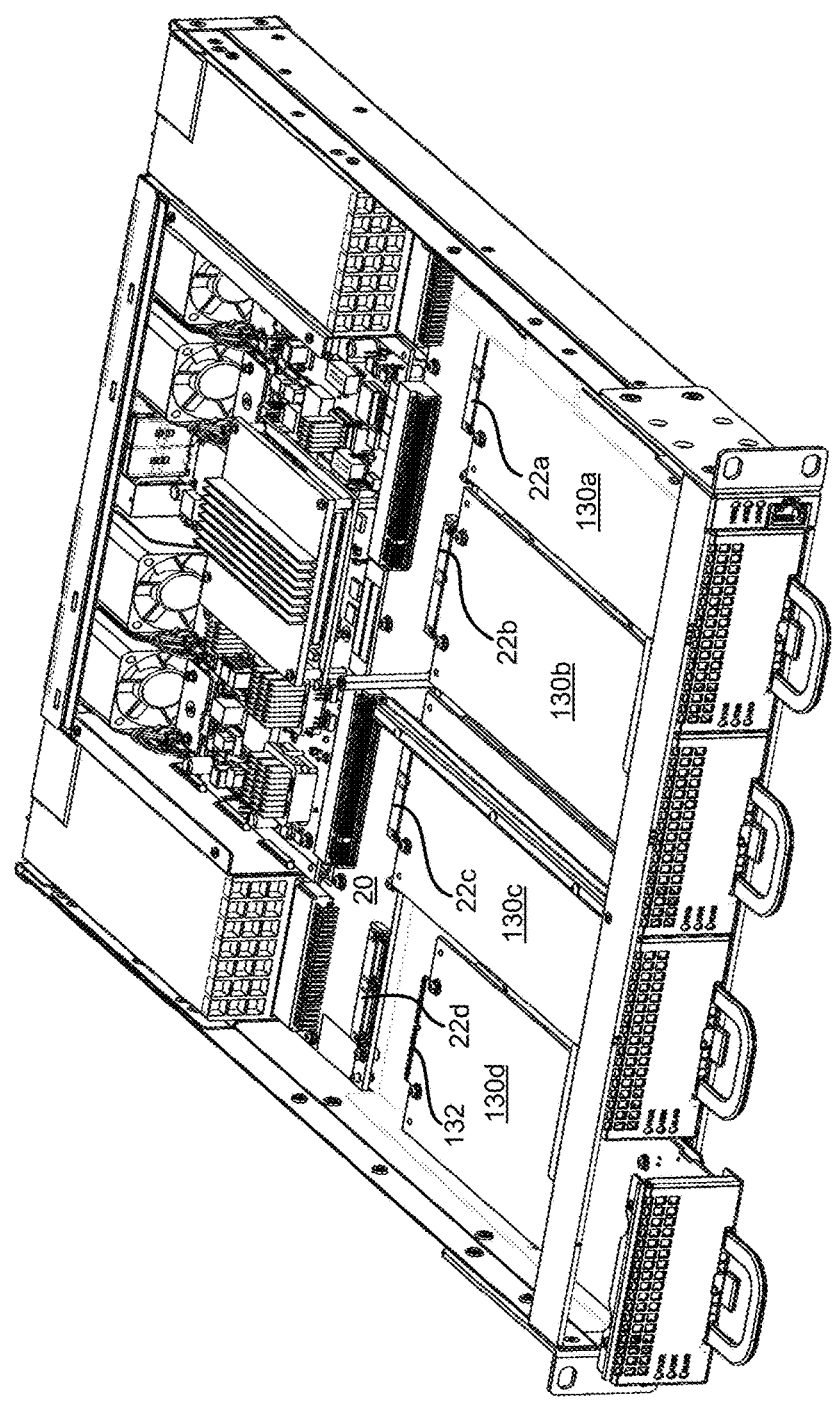
FIG. 11 is an isometric view illustrating the chassis having four expansion cards each occupying one PCIe socket in accordance with an embodiment of the present invention.

Referring to FIGS. 9-11, the configuration of the expansion sockets 22a-22d enables various sizes of expansion cards to be inserted within the chassis. For example, as shown in FIG. 9, a single expansion card 122 may define four connectors 124a-124d each positioned to simultaneously be positioned within all of the expansion sockets 22a-22d. FIG. 9 further illustrates power supplies 120a, 120b engaging the power supply sockets 66a, 66b.

As shown in FIG. 10, one or more expansion cards 126a, 126b may define two connectors 128a, 128b that each simultaneously engage a pair of expansion sockets 22a, 22b and 22c, 22d. As shown in FIG. 11, one or more expansion cards 130a, 130d may each engage only one socket 22a-22d per card. Various combinations of these types of cards, 122, 126a-126b, 130a-130d may be used with the chassis 10. For example, a dual-connector card 126a may be used with two single-connector cards 130a-130b. Other types of expansion cards may be used with the chassis 10, such as a card including three connectors positioned to simultaneously engage three of the sockets 22a-22d. Likewise, where more than four sockets 22a-22d are included on the midplane 10, a card with more than four connectors may simultaneously engage some or all of them.

Figure 12:
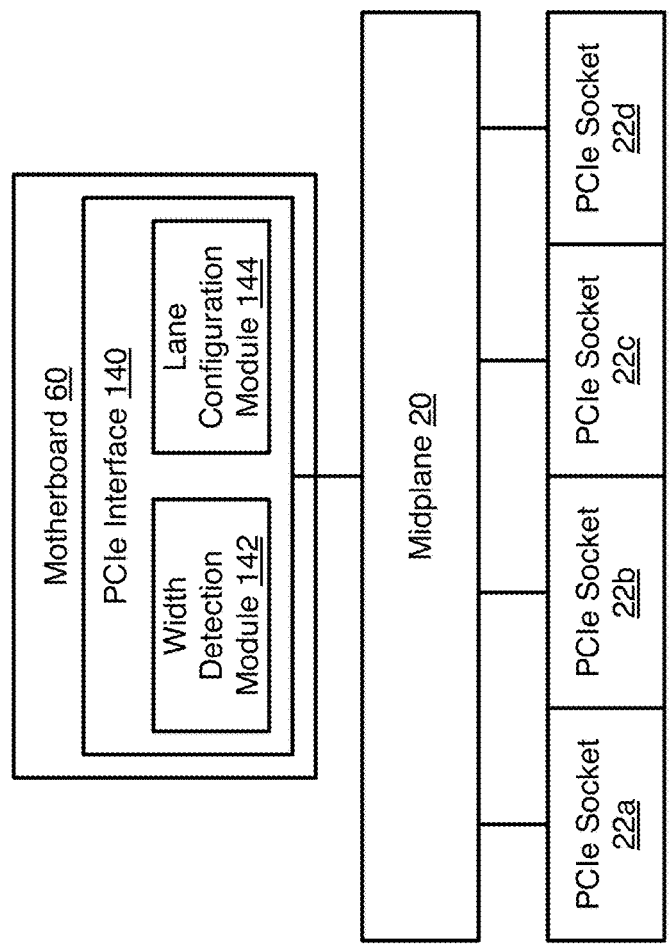
FIG. 12 is a schematic block diagram of a system implementing variable width expansion card connections in accordance with an embodiment of the present invention.

FIG. 12 illustrates a schematic diagram of a motherboard 60 engaged with the chassis 10. In particular, the motherboard 60 may implement a PCIe interface 140. The PCIe interface 140 may include a width detection module 142 and a lane configuration module 144. The width detection module 142 detects how many of the sockets 22a-22d are occupied by a single card and the lane configuration module 144 allocates lanes connected to those sockets to that card. The width detection module 142 may detect the width of a card based on signals detected on the pins of the expansion sockets 22a-22d, an identifier or descriptor provided by the expansion card, or some other means. The lane configuration module 144 may associate or map the pins of one or more of the sockets 22a-22d to a single card and route traffic to and from the card using the allocated lanes. The lane configuration module 144 may further provide a secondary or redundant path to one or more expansion cards. For example, a card may occupy multiple expansion sockets 22a-22d but only a subset of those occupied are used with the remainder being allocated to the card and used only if one of the subset fails.

In some embodiments, the advantages of the width detection module 142 and lane configuration module 144 may be achieved by the use of a motherboard coupling directly to the expansion sockets 22a-22d. For example, the expansion sockets 22a-22d may be mounted to the circuit board 62 of the motherboard 60 rather than to a midplane 20.

FIG. 12 illustrates the invention in terms of a block diagram. It will be understood that each block of diagram, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the diagram block or blocks.

Figure 13:
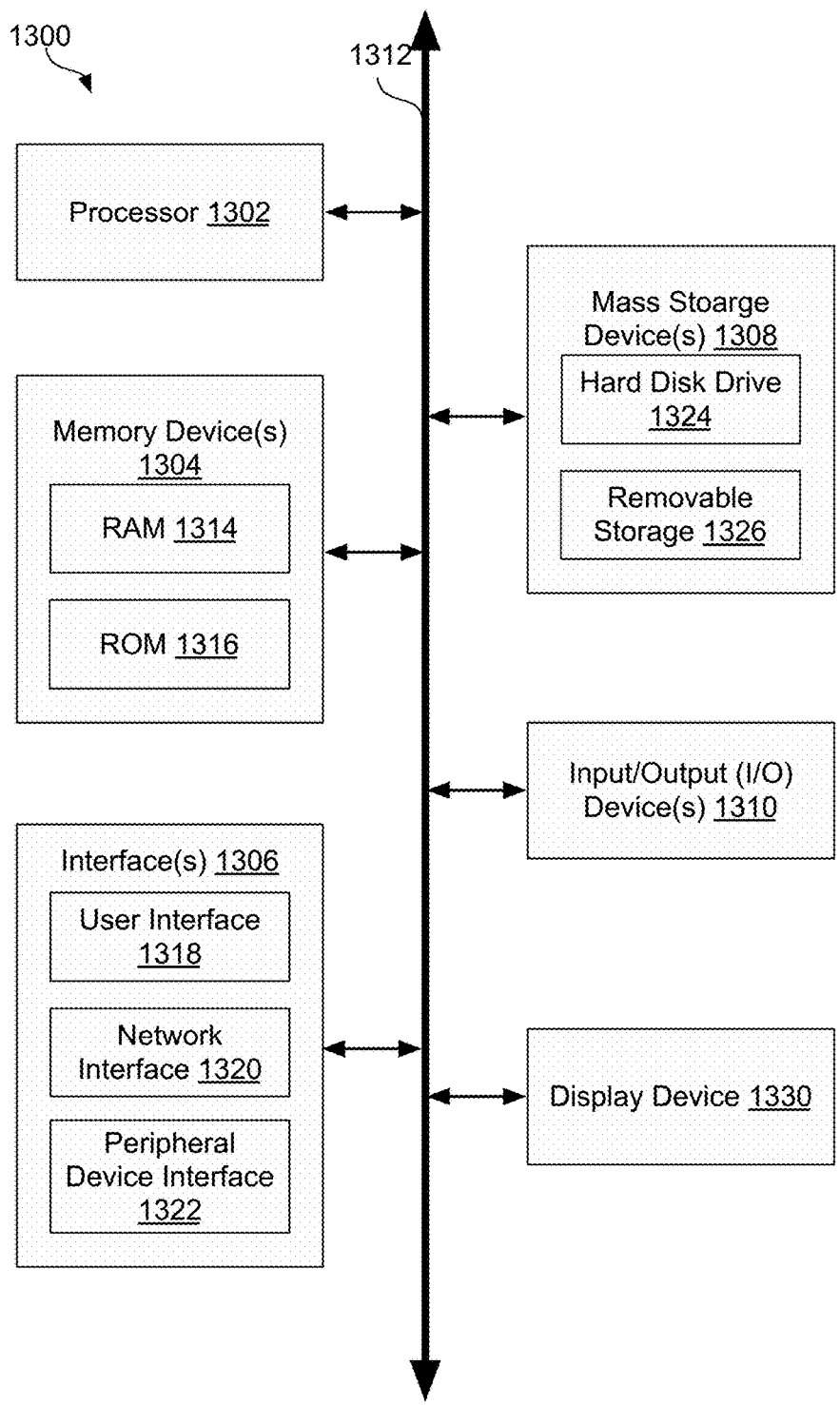
FIG. 13 is a schematic block diagram of components of a motherboard in accordance with the prior art.

FIG. 13 is a block diagram illustrating an example computing device 1300. The motherboard 60 may have some or all of the attributes of the computing device 1300 or may be coupled to one or more peripheral devices to achieve the configuration of the computing device 1300. The computing device 1300 may be used to perform various procedures, such as those discussed herein. Computing device 1300 can function as a server, a client, or any other computing entity. Computing device 1300 can perform various monitoring functions as discussed herein, and can execute one or more application programs.

Computing device 1300 includes one or more processor(s) 1302, one or more memory device(s) 1304, one or more interface(s) 1306, one or more mass storage device(s) 1308, one or more Input/Output (I/O) device(s) 1310, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include various types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device is a hard disk drive 1324. Various drives may also be included in mass storage device(s) 1308 to enable reading from and/or writing to the various computer readable media. Mass storage device(s) 1308 include removable media 1326 and/or non-removable media.

I/O device(s) 1310 include various devices that allow data and/or other information to be input to or retrieved from computing device 1300. Example I/O device(s) 1310 include cursor control devices, keyboards, keypads, microphones, monitors or other display devices, speakers, printers, network interface cards, modems, lenses, CCDs or other image capture devices, and the like.

Display device 1330 includes any type of device capable of displaying information to one or more users of computing device 1300. Examples of display device 1030 include a monitor, display terminal, video projection device, and the like.

Interface(s) 1306 include various interfaces that allow computing device 1300 to interact with other systems, devices, or computing environments. Example interface(s) 1306 include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, etc.), keyboards, and the like.

Bus 1312 allows processor(s) 1302, memory device(s) 1304, interface(s) 1306, mass storage device(s) 1308, and I/O device(s) 1310 to communicate with one another, as well as other devices or components coupled to bus 1312. Bus 1312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1300, and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The present invention may be embodied in other specific forms without departing from its spirit or essential characteristics. The described embodiments are to be considered in all respects only as illustrative, and not restrictive. In particular, although the embodiments above are described above with respect to PCIe sockets, other connector shapes and protocols may also be implemented in the same manner. The scope of the invention is, therefore, indicated by the appended claims, rather than by the foregoing description. All changes which come within the meaning and range of equivalency of the claims are to be embraced within their scope.

What is claimed is:

1. An apparatus comprising:
a chassis defining a motherboard slot; and
a midplane including
a motherboard socket positioned to connect to a motherboard inserted within the motherboard slot;
a plurality of expansion sockets electrically connected to the motherboard socket, each expansion socket of the plurality of sockets defining a plurality of connector pins arranged in one or more rows, each row of the one or more rows being coplanar and collinear with a corresponding row in the other sockets of the plurality of sockets, and
an expansion interface on the motherboard, wherein the expansion interface comprises a processor and memory storing instructions that, when executed, cause the processor to execute a width detection module to detect a number of the plurality of expansion sockets occupied by an expansion card inserted into one or more of the plurality of expansion sockets based on one of signals detected on pins of the one or more of the plurality of expansion sockets and an identifier provided by the expansion card; and execute a lane configuration module to allocate a number of communication lanes equal to the number of the plurality of expansion sockets occupied by the expansion card for traffic routing to and from the expansion card and allocate a redundant path to the expansion card based on unoccupied communication lanes, wherein the expansion card connects to one or more of the plurality of extension sockets.

2. The apparatus of claim 1, wherein:
each expansion socket of the plurality of expansion sockets defines an opening having a long dimension and a narrow dimension perpendicular to the long dimension, the long dimension being larger than the narrow dimension;
the one or more rows of connector pins of each expansion socket of the plurality of expansion sockets include first and second rows of connector pins, the first row of connector pins being positioned on a first side of an opening defined by the each socket and the second row of connector pins being positioned on a second side of the opening opposite the first side, the first and second sides being parallel to the long dimension; and
the first rows of connector pins of the plurality of expansion sockets are collinear and coplanar with one another and the second rows of connector pins of the plurality of expansion sockets are collinear and coplanar with one another.

3. The apparatus of claim 1, wherein the motherboard socket faces an opposite direction from the plurality of expansion sockets.

4. The apparatus of claim 1, wherein:
the motherboard slot is configured such that a circuit board of the motherboard inserted within the motherboard slot is parallel to a first plane; and
wherein each row of the one or more rows of the each expansion socket is coplanar with a corresponding row in the other expansion sockets of the plurality of expansion sockets in a plane parallel to the first plane.

5. The apparatus of claim 4, wherein the chassis defines a bottom plate parallel to the first plane.

6. The apparatus of claim 5, wherein the chassis defines upper and lower edges secured to the bottom plate and extending perpendicularly away from the bottom plate, the upper and lower edges being parallel to one another.

7. The apparatus of claim 6, wherein the motherboard slot comprises first and second flanges secured to the bottom plate and extending perpendicularly away from the bottom plate, first line being orthogonal to the first and second flanges, the first and second flanges being parallel to one another and each defining an edge receiver configured to receive an edge of the circuit board of the motherboard inserted within the motherboard slot.

8. The apparatus of claim 1, wherein the plurality of expansion sockets includes four expansion sockets.

9. The apparatus of claim 8, wherein the motherboard socket includes first and second sockets offset that are collinear and coplanar.

10. The apparatus of claim 1, wherein the plurality of expansion sockets are peripheral component interconnect express (PCIe) sockets.

11. A method comprising:
providing
a chassis defining a motherboard slot; and
a midplane including (a) a motherboard socket positioned to connect to a motherboard inserted within the motherboard slot, and (b) a plurality of expansion sockets electrically connected to the motherboard socket, each expansion socket of the plurality of expansion sockets defining a plurality of connector pins arranged in one or more rows, each row of the one or more rows being coplanar and collinear with a corresponding row in all other expansion sockets of the plurality of expansion sockets;
inserting a motherboard into the motherboard slot having a connector of the motherboard inserted within the motherboard socket;
inserting a connector of a first expansion card into one or more expansion sockets of the plurality of expansion sockets;
operating an expansion interface on the motherboard, wherein the expansion interface comprises a processor and memory storing instructions that, when executed, cause the processor to
execute a width detection module for detecting, a number of the one or more expansion sockets occupied by an expansion card inserted into one or more expansion sockets based on one of signals detected on pins of the one or more of the plurality of expansion sockets and an identifier provided by the expansion card; and
execute a lane configuration module for allocating a number of communication lanes equal to the number of the one or more expansion sockets occupied by the expansion card for traffic routing to and from the expansion card and allocating a redundant path to the expansion card based on unoccupied communication lanes, wherein the expansion card connects to one or more of the plurality of extension sockets, wherein the expansion interface comprises a processor and memory storing instructions that, when executed, cause the processor to perform the detecting and the allocating steps.

12. The method of claim 11, further comprising:
removing the first expansion card from a first expansion socket; and
inserting first and second connectors of a second expansion card into the first expansion socket and a second expansion socket of the plurality of expansion sockets, the first and second connectors being monolithic portions of a single circuit board.

13. The method of claim 11, further comprising:
removing the first expansion card from a first expansion socket; and
inserting first, second, third, and fourth connectors of a second expansion card into the first expansion socket and a second, a third, and a fourth expansion socket of the plurality of expansion sockets, the first, second, third, and fourth connectors being monolithic portions of a single circuit board.

14. The method of claim 11, wherein the plurality of expansion sockets are peripheral component interconnect express (PCIe) sockets.

15. An apparatus comprising:
a plurality of expansion sockets;
a motherboard coupled to the plurality of expansion slots, the mother board including one or more processors, one or more memory devices operably coupled to the one or more processors, and an expansion interface defining a plurality of communication lanes from the plurality of expansion sockets to the one or more processors and the one or more expansion sockets, and the expansion interface is executed by one or more memory devices storing instructions that, when executed, cause the one or more processors to execute a width detection module to detect a number of the plurality of expansion sockets occupied by an expansion card inserted into one or more of the plurality of expansion sockets based on one of signals detected on pins of the one or more of the plurality of expansion sockets and an identifier provided by the expansion card; and execute a lane configuration module to allocate a number of communication lanes equal to the number of the plurality of expansion sockets occupied by the expansion card for traffic routing to and from the expansion card and allocate a redundant path to the expansion card based on unoccupied communication lanes, wherein the expansion card connects to one or more of the plurality of extension sockets.

16. The apparatus of claim 15, wherein the plurality of expansion sockets include four expansion sockets and wherein the plurality of communication lanes include four communication lanes each configured to transmit traffic from one expansion socket of the four expansion sockets.

17. The apparatus of claim 15, further comprising:
a chassis defining a motherboard slot, the motherboard being inserted within the motherboard slot; and
a midplane including
   a motherboard socket the motherboard being connected to the motherboard socket; and
   the plurality of expansion sockets, the plurality of expansion sockets being electrically connected to the motherboard socket, each expansion socket of the plurality of sockets defining a plurality of connector pins arranged in one or more rows, each row of the one or more rows being coplanar and collinear with a corresponding row in the other sockets of the plurality of sockets.

18. The apparatus of claim 17, wherein:
the one or more rows of connector pins of each socket of the plurality of sockets include first and second rows of connector pins; and
the first rows of connector pins of the plurality of expansion sockets are collinear and coplanar and the second rows of connector pins of the plurality of expansion sockets are collinear and coplanar.

19. The apparatus of claim 17, wherein the motherboard socket faces an opposite direction from the plurality of expansion sockets.

20. The apparatus of claim 15, wherein the plurality of expansion sockets are peripheral component interconnect express (PCIe) sockets.

* * * * *